United States Patent
Lei (10) Patent No.: US 9,643,506 B2
(45) Date of Patent: May 9, 2017

(54) PORTABLE BACKUP CHARGER

(71) Applicant: Shenzhen Carku Technology Co., Ltd., Shenzhen (CN)

(72) Inventor: Xingliang Lei, Shenzhen (CN)

(73) Assignee: SHENZHEN CARKU TECHNOLOGY CO., LTD., Yifang Industrial Park, Bantian, Longgang District, Shenzhen (CN)

( * ) Notice: Subject to any disclaimer, the term of this patent is extended or adjusted under 35 U.S.C. 154(b) by 0 days.

(21) Appl. No.: 15/141,841

(22) Filed: Apr. 29, 2016

(65) Prior Publication Data

US 2016/0303989 A1    Oct. 20, 2016

Related U.S. Application Data

(63) Continuation-in-part of application No. 14/298,986, filed on Jun. 9, 2014, now Pat. No. 9,496,728, and a continuation-in-part of application No. PCT/CN2012/083793, filed on Oct. 31, 2012.

(30) Foreign Application Priority Data

Dec. 9, 2011 (CN) .......................... 2011 1 0409190

(51) Int. Cl.
  *B60L 11/18*    (2006.01)
  *H02J 7/00*    (2006.01)
  *H02J 9/06*    (2006.01)
  *H05B 33/08*    (2006.01)

(52) U.S. Cl.
  CPC ....... *B60L 11/1822* (2013.01); *B60L 11/1818* (2013.01); *B60L 11/1864* (2013.01); *H02J 7/0021* (2013.01); *H02J 7/0026* (2013.01); *H02J 9/061* (2013.01); *H05B 33/0815* (2013.01); *Y02B 20/341* (2013.01); *Y10T 307/352* (2015.04)

(58) Field of Classification Search
  CPC .. H02J 7/0026; Y10T 307/352; Y02B 20/341; H05G 33/0815
  USPC ....................................................... 307/150
  See application file for complete search history.

*Primary Examiner* — Robert Deberadinis
(74) *Attorney, Agent, or Firm* — Jun He Law Offices P.C.; James J. Zhu (57) ABSTRACT

A portable backup charger includes a set of batteries; a charging circuit; a charge-discharge protection circuit; multiple DC-DC voltage adjusting circuits including a DC-DC 19 V-output boost circuit, a 12 V output circuit, and a DC-DC 5 V-output buck circuit; a MCU circuit; a 12 V output circuit outputting a current in the range of 100 A to 400 A; and a 150 A-250 A fuse. The set of batteries is composed of lithium iron phosphate batteries and lithium cobalt oxide batteries. The 12 V output circuit outputting a current in the range of 100 A to 400 A is directly connected to the set of batteries without interference with the charge-discharge protection circuit. The charger is convenient for carrying, and is capable of providing power for different electrical instruments including for an automobile.

33 Claims, 10 Drawing Sheets

PORTABLE BACKUP CHARGER

CROSS-REFERENCE TO RELATED APPLICATIONS

This application is a continuation-in-part application of U.S. application Ser. No. 14/298,986, filed on Jun. 9, 2014, which is a continuation-in-part application of International Application No. PCT/CN2012/083793, filed on Oct. 31, 2012, which claims priority from Chinese Patent Application No. 201110409190.9, filed on Dec. 9, 2011, the entire contents of which are incorporated herein by reference.

TECHNICAL FIELD

The application relates to a DC power supply, and particularly to a portable backup charger for supplying direct current to various types of devices.

BACKGROUND

Mobile power supplies for mobile devices are known but usually suffer from current and voltage limitations.

SUMMARY

In view of the above described problem, it is one objective of the application to provide a portable backup charger which is able to provide DC-current outputs in various-level voltages, and is able to output a large current source as the start-up source of the automobile.

It is another objective of the application to improve the safety performance of the portable backup charger.

To achieve the above objectives, the present application provides a portable backup charger which has the function of self-charging, is able to provide DC-current outputs in various-level voltages, and is able to output a large current source as the start-up source of the automobile.

According to an aspect of the present application, there is provided a portable backup charger. The charger includes a battery pack having at least one battery cell; at least one output port coupled to the battery pack, wherein the battery pack is configured to output a first current through one or more output ports of the at least one output port in a first operating mode; a pair of output terminals detachably coupled to the battery pack and having a current path to the battery pack different from that of the at least one output port, wherein the battery pack is configured to output a second current capable of starting a vehicle engine through the pair of output terminals in a second operating mode, wherein the second current is higher than the first current; a first protection circuit coupled to the battery pack and configured to protect the battery pack when the battery pack is working in the first operating mode; a second protection circuit coupled to the battery pack and configured to prevent overcurrent condition of the second current when the battery pack is working in the second operating mode.

According to another aspect of the present application, there is provided a portable backup charger. The charger includes a battery pack having at least one battery cell; a first current path through which a first current is output by the battery pack when it is working in a first operating mode; a second current path through which a second current capable of starting a vehicle engine is output by the battery pack when it is working in a second operating mode, wherein the second current is higher than the first current; a first protection circuit coupled to the battery pack and configured to protect the battery pack when it is working in the first operating mode; a second protection circuit coupled in the second current path and configured to prevent overcurrent condition of the second current when it is working in the second operating mode.

According to a further aspect of the present application, there is provided a portable backup charger. The portable backup charger comprises a set of batteries; a charging circuit connected to an input end of the set of batteries for charging the set of batteries; a charge-discharge protection circuit connected to the two ends of the set of batteries for protecting the set of batteries in the process of charging or discharging; multiple DC-DC voltage adjusting circuits comprising a DC-DC 19 V-output boost circuit, a 12 V output circuit, and a DC-DC 5 V-output buck circuit; a MCU circuit; a 12 V output circuit outputting a current in the range of 100 A to 400 A; and a 150 A-250 A fuse. The input ends of the multiple DC-DC voltage adjusting circuits are connected in parallel to the connecting point between the output end of the set of batteries and one end of the charge-discharge protection circuit. One end of the 150 A-250 A fuse is connected to the set of batteries, and the other end is connected to the 12 V output circuit outputting a current in the range of 100 A to 400 A. The MCU circuit is connected to the output ends of the multiple DC-DC voltage adjusting circuits, respectively. The set of batteries is composed of lithium iron phosphate batteries and lithium cobalt oxide batteries.

In a class of the embodiment, the portable backup charger further comprises a LED drive circuit and a LED light. The input end of the LED drive circuit is connected to the output end of the set of batteries. The LED light is connected to the output end of the LED drive circuit.

In a class of the embodiment, the portable backup charger further comprises an intelligent LED battery indicator. The intelligent LED battery indicator is connected to the MCU circuit for indicating the power storage of the set of batteries.

In a class of the embodiment, the 12 V output circuit outputting a current in the range of 100 A to 400 A is connected to the two ends of the set of batteries directly without passing the charging-discharging protection circuit.

In a class of the embodiment, the output terminals of the 12 V output circuit outputting a current in the range of 100 A to 400 A adopt a reverse connection-proof plug, and the external positive and negative connecting wires for the output terminals are two silica-gel wires indifferent lengths.

In a class of the embodiment, the 150 A-250 A fuse is connected to positive external connecting wire or the negative external connecting wire.

In a class of the embodiment, the lithium iron phosphate battery or lithium cobalt oxide battery is capable of outputting a high power, and the charge-discharge rate of the battery is 20 c-70 c.

The advantages of the present application include: (1) since the set of batteries is composed of lithium iron phosphate batteries or lithium cobalt oxide batteries that possesses the characteristics of light weight, small volume, durability, high instantaneous current, and high repeatability in charging, the portable backup charger is capable of providing large start-up current for an automobile; (2) since multiple DC-DC voltage adjusting circuits outputting different voltages are connected to the set of batteries, by controlling the MCU circuit, the portable backup charger is able to supply power for different types of electrical instruments including cellphone, computer, and digital camera; (3) since the portable backup charger comprises a LED drive circuit and a LED light, it is able to provide outdoor light.

Therefore, the portable backup charger of the present application has multiple functions, is convenient for carrying, and is capable of providing power for different electrical instruments in living, touring, or travelling.

DETAILED DESCRIPTION

Exemplary embodiments of the present application will be described below.

Figure 1:
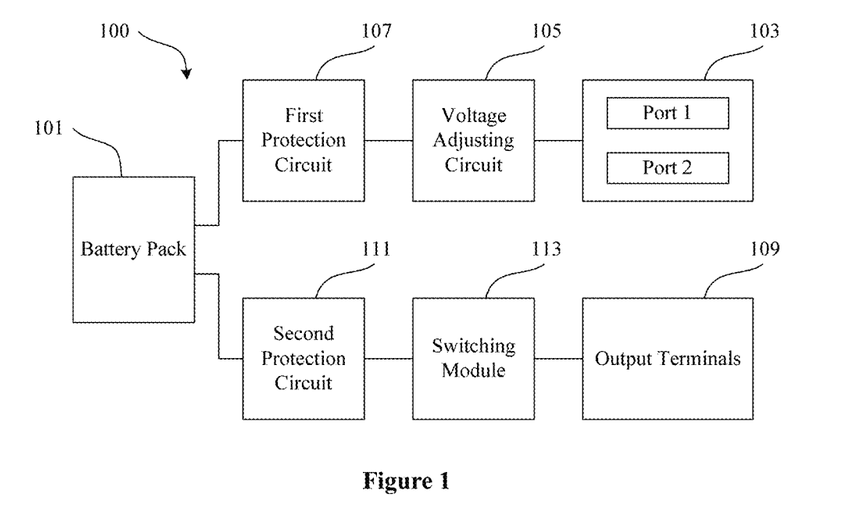
FIG. 1 is a block diagram of a portable backup charger according to an embodiments of the application.

FIG. 1 is a block diagram of a portable backup charger 100 according to an embodiment of the present application. The portable backup charger 100 can be used as a backup power source to charge or supply mobile electronic devices such as mobile phones, tablet computers or laptop computers. Moreover, the portable backup charger 100 can be used as a starter for starting a vehicle engine, or specifically, for starting an electric motor of the vehicle engine. The electric motor can generally be started by a high current at a voltage of 12 V or 24 V. The vehicle engine may be an internal combustion engine of a vehicle such as a car, a truck, a bus, a sport utility vehicle or the like.

As shown in FIG. 1, the portable backup charger 100 includes a battery pack 101 (corresponding to referral 1 of FIG. 3), which may be consisted of one or more battery cells. The battery cells may be coupled in series and/or in parallel to increase an output voltage or capacity of the battery pack 101. In certain embodiments, the battery pack 101 has three battery cells that are coupled in series with each other. Each battery cell may be of an output voltage of 3.0V to 4.2 V (e.g. 3.7V) such that the battery pack 101 has an output voltage of 9.0V to 12.6V, which is capable to start the 12V electric motor of the vehicle engine or electric motors operable under a rating voltage lower than 12V. It will be appreciated that the number of battery cells of the battery pack 101 may be determined according to practical requirements. For example, six battery cells may be included in the battery pack 101 for the 24V vehicle-starting application.

The battery cells of the battery pack 101 may be of the same type or the same model. In certain embodiments, the battery cells may be lithium based battery cells such as lithium iron phosphate (LiFeO$_4$ or LiFePO) battery cell or lithium cobalt oxide (LiCoO$_2$) battery cell. In certain embodiments, the battery cells of the battery pack 101 have a high discharge rate ranging from 20 c to 70 c. Accordingly, the battery cells of the battery pack 101 can withstand the high current (e.g. 100 to 400 A) flowing therethrough when the portable battery charger 100 is used to start the electric motor.

Figure 2:
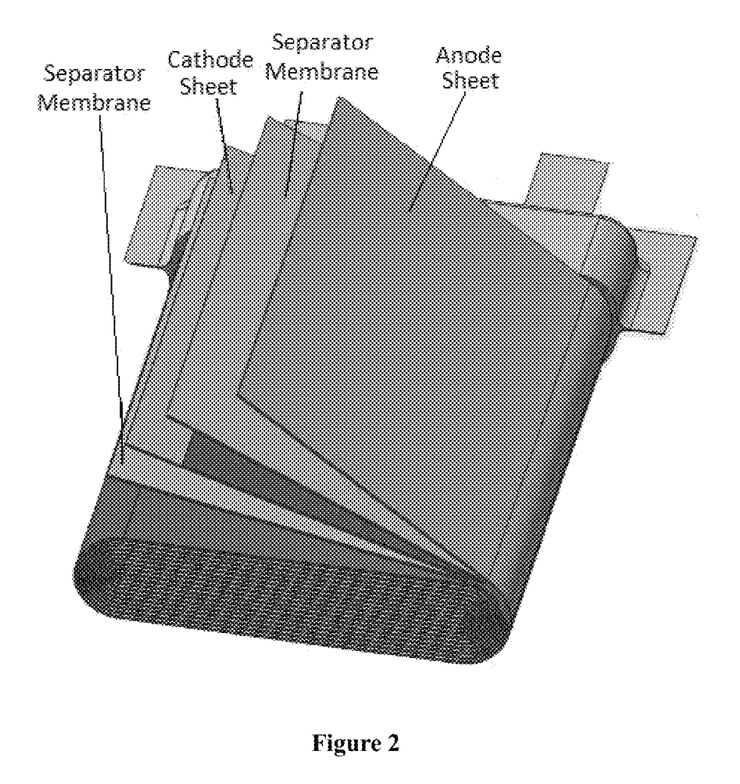
FIG. 2 shows an exemplary battery cell of the battery pack shown in FIG. 1.

FIG. 2 shows an exemplary battery cell of the battery pack shown in FIG. 1. The battery cell has an anode sheet and a cathode sheet which are separated by a separator membrane. The separator membranes are porous and allow ions to be transported between the anode sheet and the cathode sheet, but are electrically insulating and serve to insulate the two electrodes from one another. The anode sheet, the cathode sheet and the separator membrane are wound together around a central axis to form a rolled structure. The rolled structure helps to reduce the volumic size of the battery cell.

Still referring to FIG. 1, the portable battery charger 100 can work in a first operating mode or in a second operating mode. In certain embodiments, the portable backup charger 100 may further include a controller (not shown) (corresponding to referral 7 of FIG. 3) to control its operating mode. In some other embodiments, the portable backup charger 100 may be responsive to the connection of loads (e.g. devices to be charged or started) to work in the first operating mode or the second operating mode. In other words, the portable backup charger 100 may automatically change its operating mode according to one or more of its output port that are being connected with the load(s).

Specifically, when the portable battery charger 100 is working in the first operating mode, it can output one or more output currents to one or more external electronic devices, respectively. The output currents may be used to supply the operation of the electronic devices, or charge external rechargeable batteries of the electronic devices. Accordingly, the portable battery charger 100 has at least one output ports 103 coupled to the battery pack 101 through which the output currents can be output from the battery pack 101. For example, the output ports 103 may include a DC 5V output port such as a USB port, a DC 12V output port, or a DC 19V output port for connection with an input port of the laptop computer. The amplitude of the current may vary with the output port, and in certain embodiments, the current is of 0.5 to 10 A. For example, the DC 5V output port may output a current of 0.5A, 1 A or 2 A; the DC 12V output port may output a current of 10A, and the DC 19V output port may output a current of 3.5 A.

In certain embodiments, the portable battery charger 100 may further include at least one voltage adjusting circuit 105 (corresponding to referrals 4, 5 and 6 of FIG. 3) each coupled between the battery pack 101 and one of the at least one output port 103. The voltage adjusting circuit 105 is used to elevate or reduce the output voltage of the battery pack 101 to predetermined voltages at the respective output port 103. For example, the voltage adjusting circuit 105 may include a 19V output boost circuit (not shown) (corresponding to referral 4 of FIG. 3) that elevates the output voltage of the battery pack (e.g. 12V) to 19V at the DC 19V output port. The voltage adjusting circuit 105 may also include a 5V output buck circuit (not shown) (corresponding to referral 6 of FIG. 3) that reduces the output voltage of the battery pack to 5V at the DC 5V output port. It would be appreciated that the voltage adjusting circuit 105 may not be necessary for some output ports. For example, the DC 12V output port may be coupled to the 12V battery pack without voltage adjusting circuit (corresponding to referral 5 of FIG. 3) coupled therebetween.

The portable battery charger 100 includes a first protection circuit 107 (corresponding to referral 11 of FIG. 3) coupled to the battery pack 101. The first protection circuit 107 is used to protect the battery pack 101 when the current is output through the output ports 103. For example, the first protection circuit 107 is capable of detecting the voltage across each battery cell of the battery pack 101 and the output voltage of the battery pack 101, and further comparing the detected voltages with predefined voltage scopes. The voltage exceeding the predefined voltage scopes indicates overdischarge condition or overcharge condition of the corresponding battery cell or the battery pack 101. Upon detection of the voltage exceeding the predefined voltage scope, the voltage first protection circuit 107 will prohibit current outputting from the battery pack 101, for example, by switching off a relay or MOS switch coupled between the battery pack 101 and the output ports 103.

The first protection circuit 107 may also be used to protect overcurrent condition of the current outputting through the output ports 103. Upon detection of an excess current flowing through the output ports 103, the first protection circuit 107 will prohibit the current outputting from the battery pack 101, for example, by switching off the relay or MOS switch between the battery pack 101 and the output ports 103. Moreover, the first protection circuit 107 may also be used to protect overcharge condition of each battery cell or the battery pack 101. The first protection circuit 107 may be any commercially available IC chips such Model No. S8254A provided by SEIKO.

Moreover, when the portable battery charger 100 is working in the second operating mode, it can output a high current capable of starting the vehicle engine. For example, the portable battery charger 100 further includes a pair of output terminals 109 coupled to the battery pack 101, through which the high current can be output from the battery pack 101 to the vehicle engine. The current for starting the vehicle engine is higher than the currents output through the output ports 103. For example, the current for starting the vehicle engine may be of 100 A to 400 A. The pair of output terminals 109 may be coupled to two electrodes of a battery of the vehicle, which are further connected to the input nodes of the electric motor of the vehicle engine. In some embodiments, the pair of output terminals may be fixedly coupled to the battery pack 101, or may be detachably coupled to the battery pack 101.

The pair of output terminals 109 provides a current path different and separate from the current path from the battery pack 101 to the output ports 103. The first current protection circuit 107 will not detect the current flowing through the pair of output terminals 109 and therefore will generally not affect the current outputting through the pair of output terminals 109. However, if the current output through the pair of output terminals 109 significantly affects the voltage across the battery pack 101, for example, exceeding the predetermined voltage scopes, the first current protection circuit 107 will work to cut off the current path through the pair of output terminals 109.

In another embodiment, the charger can work in a third operating mode. In the third operating mode, the charger can output current through the at least one output ports 103 and through the pair of output terminals 109 simultaneously. In such a case, the charger will have both current path outputting two currents at the same time, which are protected by the first protection circuit and a second protection circuit 111 (detailed below), respectively. In other words, when working in the third operating mode, both the first protection circuit 107 and the second protection circuit 111 are active.

In certain embodiments, the charger may have two or more output ports for outputting currents at different voltages, for example, at 5V and 12V. In a preferred embodiment, when working in the first operating mode, the charger may supply currents to the respective loads coupled to the two or more output ports simultaneously.

The portable battery charger 100 also includes the second protection circuit 111 (corresponding to referral 8 of FIG. 3) coupled to the battery pack 101, which is used to protect overcurrent condition of the second current when the second current is output through the pair of output terminals 109. The second protection circuit 111 may limit the second current below a predetermined threshold such as 400 A or less. In certain embodiments, the over-current protection module may include a fuse, which has a rating current of 150 to 250 A, for example. When the pair of output terminals 109 is short-circuited due to mis-operation or other reasons, the second protection circuit 111 will be activated to cut off the current path from the battery pack 101 to the pair of output terminals 109, thereby ensuring the safety of the battery pack 101.

In certain embodiments, the pair of output terminals may be detachably coupled with the battery pack 101 via a pair of connecting wires. For example, a first connecting wire of the pair of connecting wires connects a positive electrode of the battery pack 101 with a first output terminal of the pair of output terminals, and a second connecting wire of the pair of connecting wires connects a negative electrode of the battery pack 101 with a second output terminal of the pair of output terminals. With the pair of output terminals, the positive and negative electrodes of the battery pack 101 may be coupled to positive and negative electrodes of an internal battery of the vehicle to be started. The connecting wire may be external to a battery pack housing (not shown) enclosing the battery pack 101, thereby it may be easy to connect the pair of connecting wires to or disconnect them from the battery pack 101.

The second protection circuit 111 may be built into at least one of the pair of connecting wires. For example, the fuse of the second protection circuit 111 may be disposed at an end of the first and/or second connecting wire. As an alternative embodiment, one or both of the pair of connecting wires may be segmented into two parts by the fuse built therein. Once over-current occurs at the pair of output terminals 109, the fuse may work (e.g. melt or burned out) to cut off the current path along the pair of connecting wires. Furthermore, the user may replace the connecting wires with the melted fuse using a new pair of connecting wires, which is convenient in use. Also, the fuse protection structure is simple in structure and low in cost. Alternatively, the second protection circuit 111 may be built into the battery pack housing.

In certain embodiments, a switching module 113 (corresponding to referral 9 of FIG. 3) functioning as output circuit may be coupled in the pair of output terminals 109. The switching module 113 is operable to switch on or off the current from the battery pack 101 through the pair of output terminals 109, for example, in response to a manual input of a user, or according to a predetermined control instruction. For example, the switching module 113 may prohibit the outputting of the starting current after a predetermined time period from the outputting of the current, because the starting current is of a big amplitude such as 100 A or even higher. Timely switching off the switching module 113 helps to reduce the power consumption of the engine starting as well as increase the lifetime of the battery pack 101. In certain embodiments, the output circuit may further detect the voltage of the external vehicle battery, and compare the detected voltage with a reference voltage scope. The output circuit may switch on the current outputting through the pair of output terminals only if the detected voltage falls within the reference voltage scope. In certain embodiments, the output circuit may periodically switch on and off the connection with the external vehicle battery. For example, the connection is periodically switched off for 0.5 seconds after being switched on for five seconds. Each time the portable backup charger is reconnected with the external vehicle battery, the output circuit will detect the voltage of the external vehicle battery, and then determine whether or not to maintain the current outputting through the pair of output terminals. In certain embodiments, the switching module 113 may be built into at least one of the pair of connecting wires. For example, the switching module 113 may be implemented on a printed circuit board or in an integrated circuit chip, which is further enclosed inside a compact housing and coupled in the pair of connecting wires. In some other embodiments, the switching module 113 may be built into the battery pack housing instead of into the pair of connecting wires.

In certain embodiments, the pair of connecting wires has a reverse connection-proof plug. The reverse connection-proof plug can prevent false connection of the pair of connecting wires with a socket in the housing of the portable backup charger, thereby improving the safety of the portable backup charger. In certain embodiments, the pair of connecting wires are silica-gel wires of different lengths.

Figure 3:
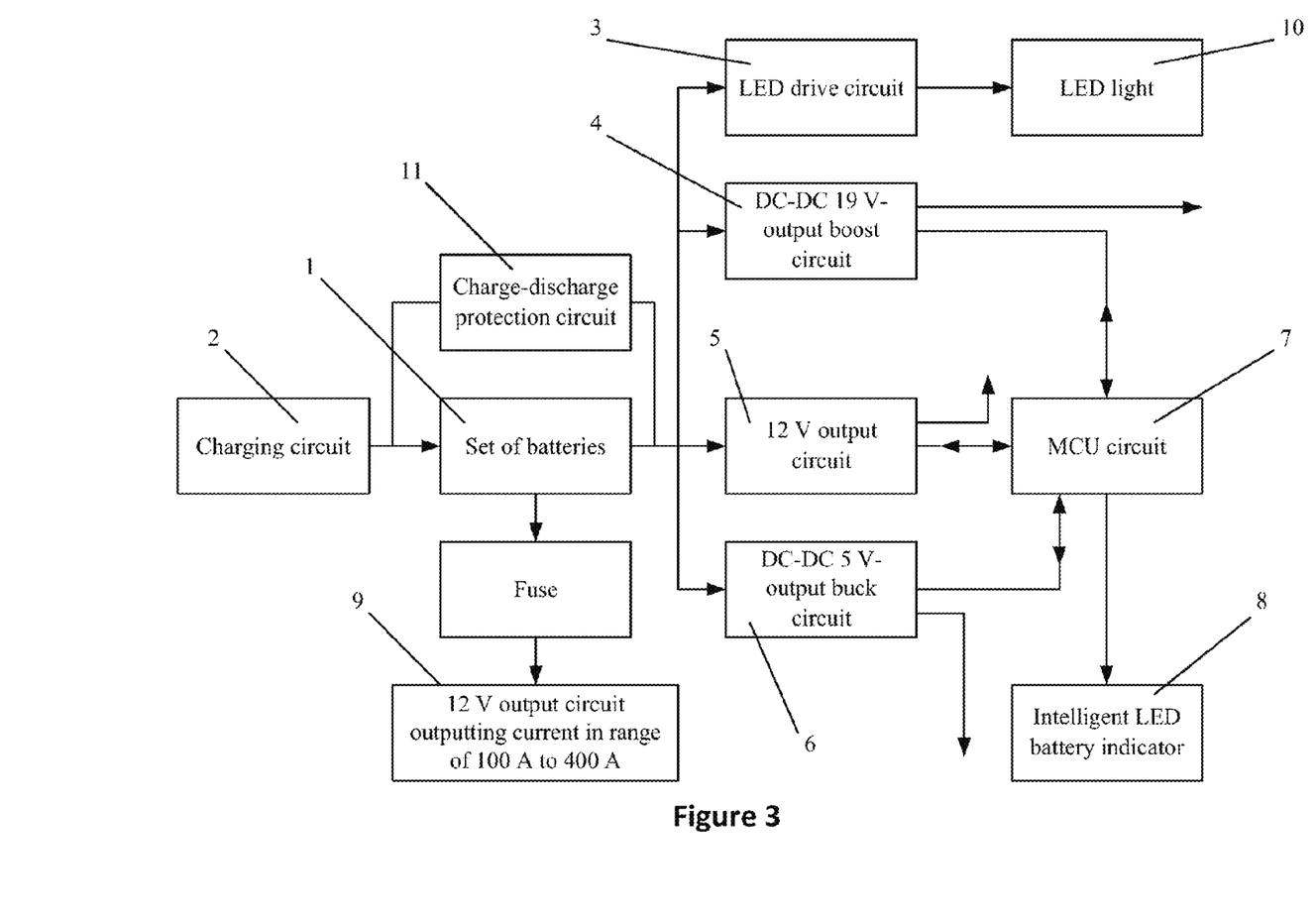
FIG. 3 is a schematic block diagram of the portable backup charger in accordance with one embodiment of the application.
Figure 4:
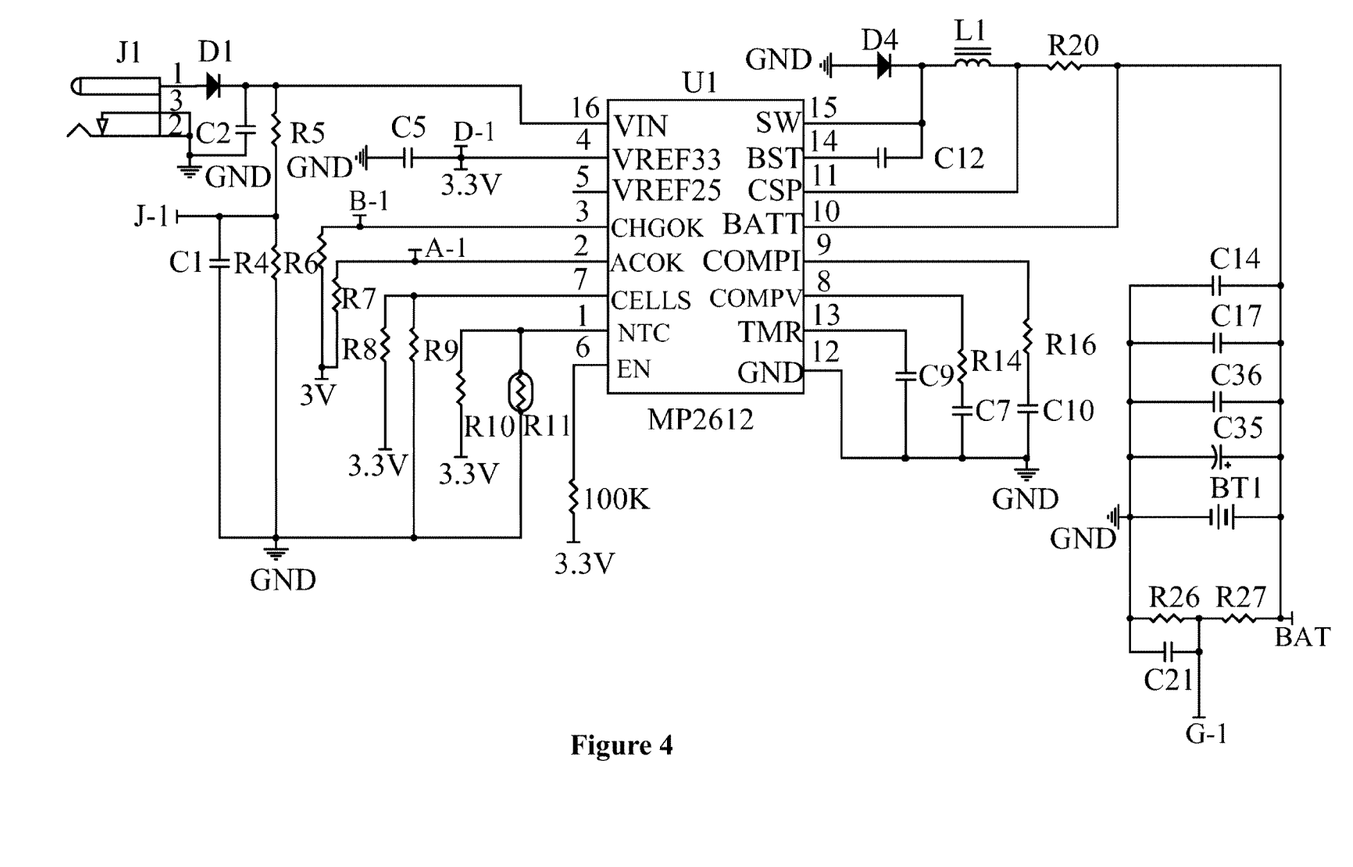
FIG. 4 is a circuit diagram 1-1 of the portable backup charger in accordance with one embodiment of the application.
Figure 5:
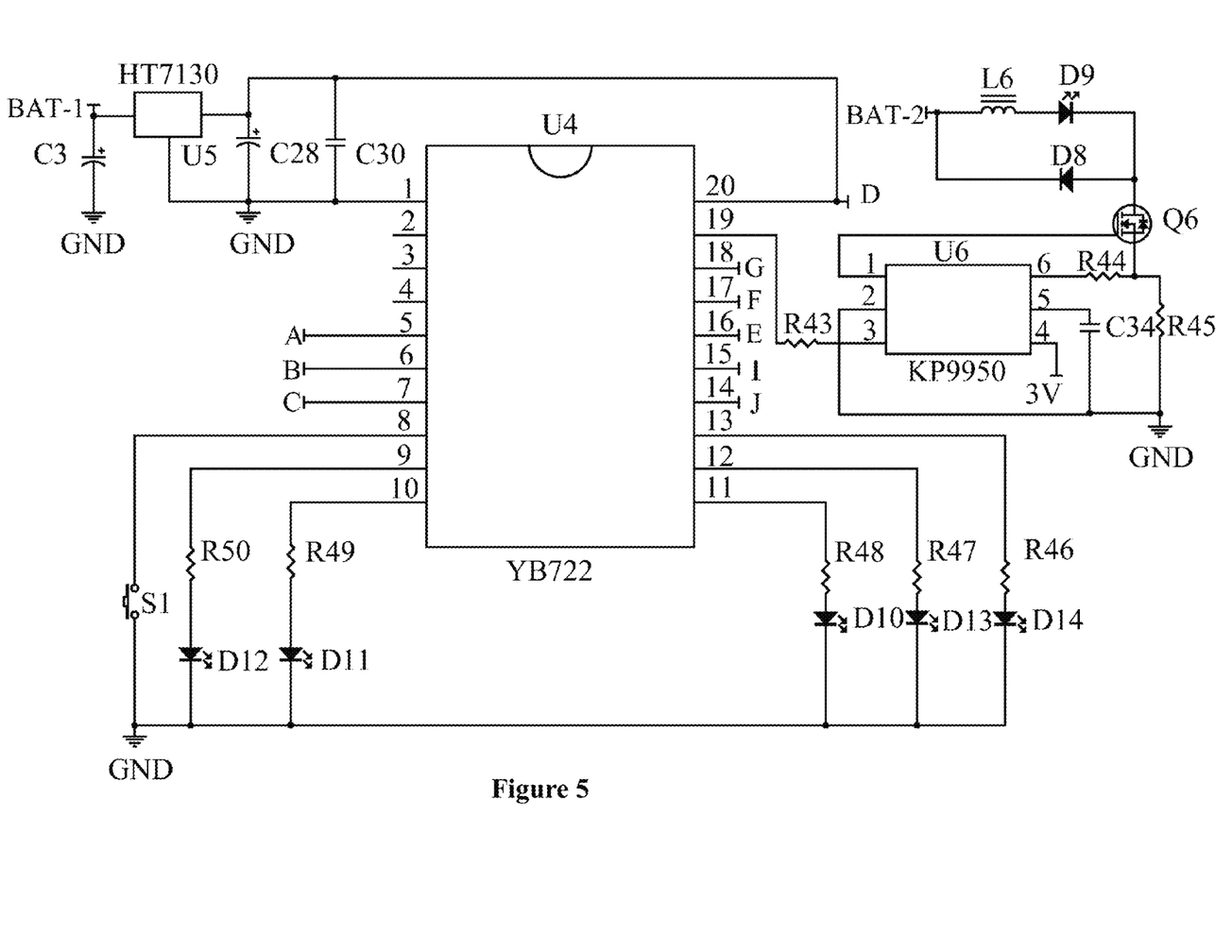
FIG. 5 is a circuit diagram 1-2 of the portable backup charger in accordance with one embodiment of the application.
Figure 6:
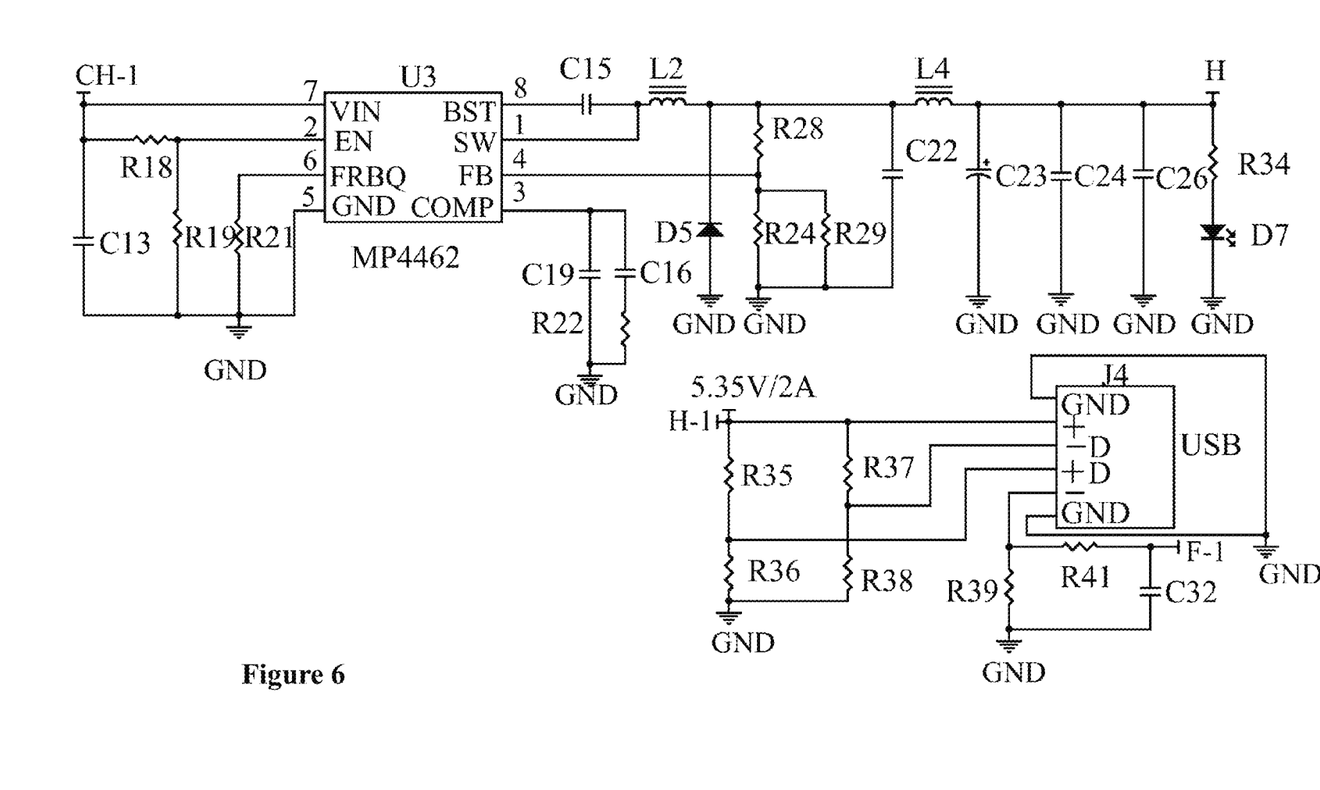
FIG. 6 is a circuit diagram 1-3 of the portable backup charger in accordance with one embodiment of the application.
Figure 7:
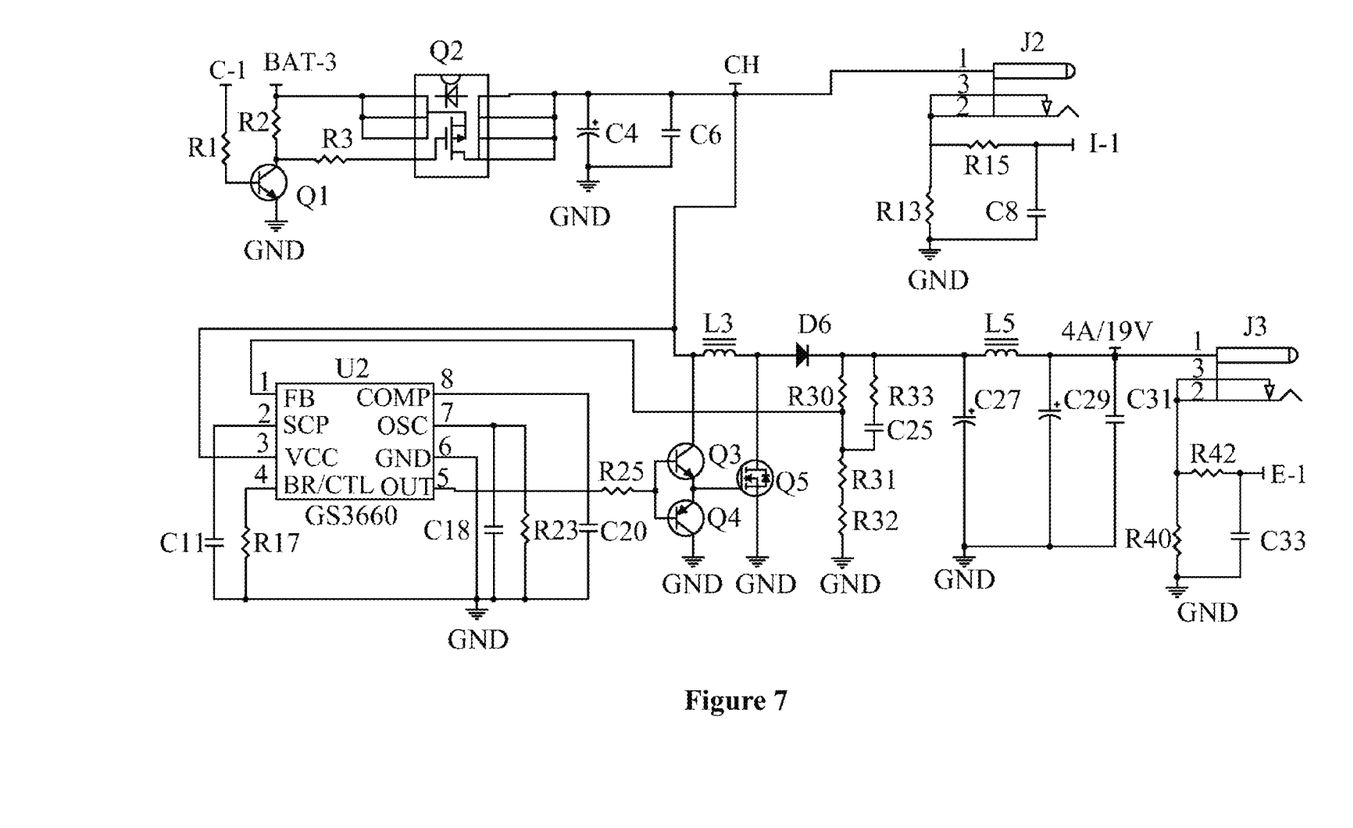
FIG. 7 is a circuit diagram 1-4 of the portable backup charger in accordance with one embodiment of the application.
Figure 8:
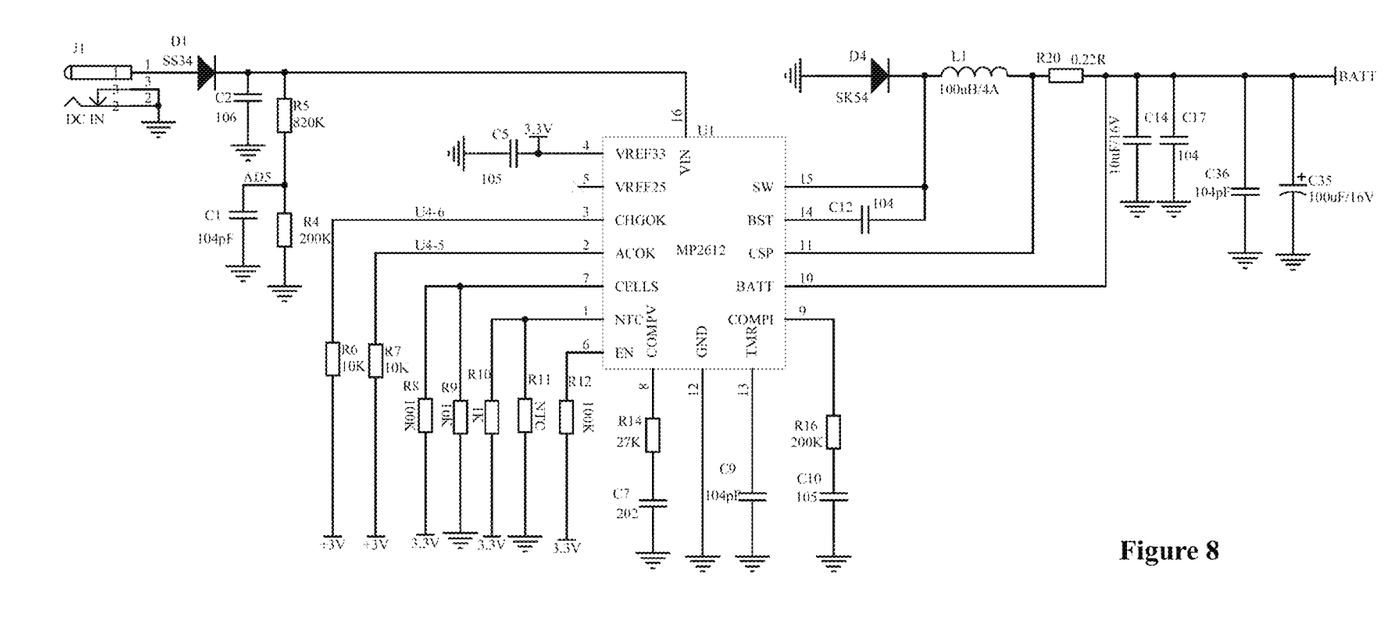
FIGS. 8-11 together show another circuit diagram of the portable backup charge in accordance with one embodiment of the application, each of which shows a portion of the circuit diagram.
Figure 9:
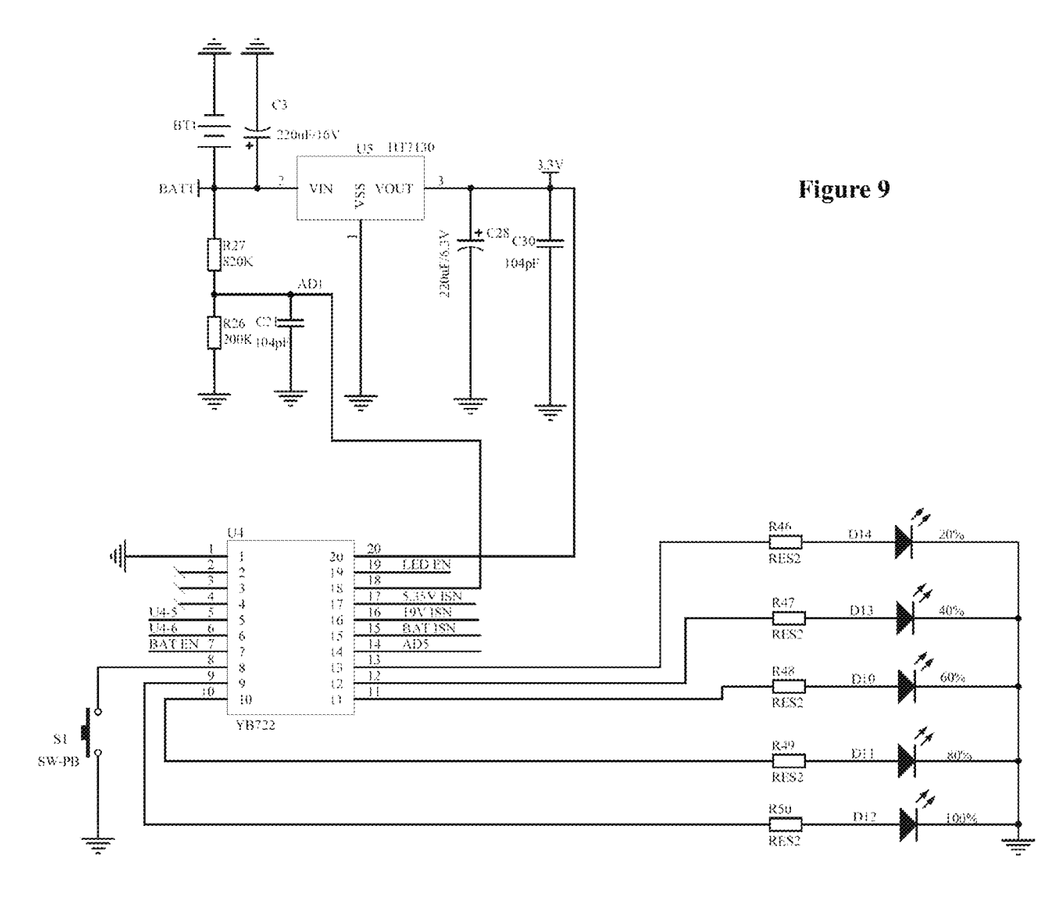
Figure 10:
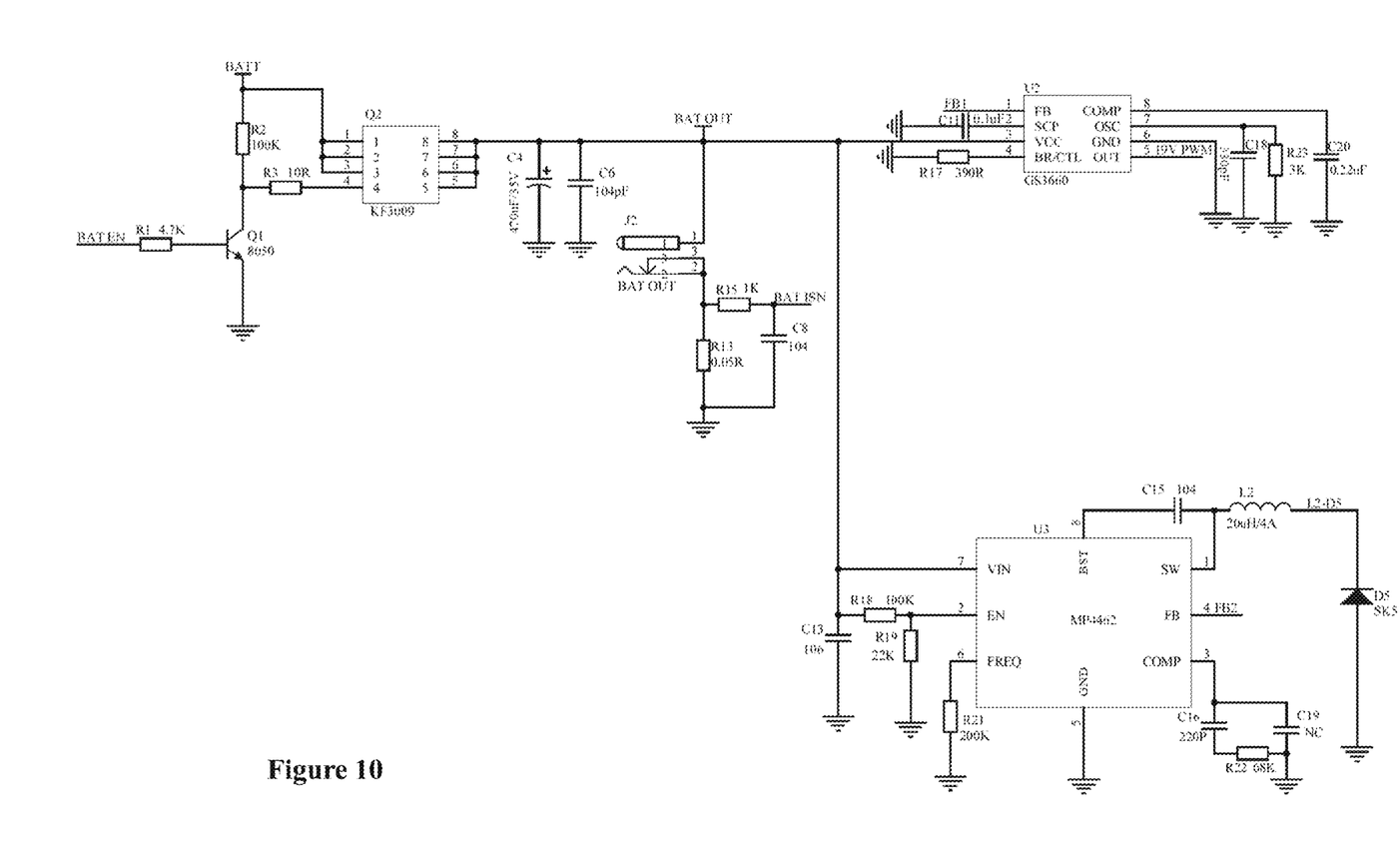
Figure 11:
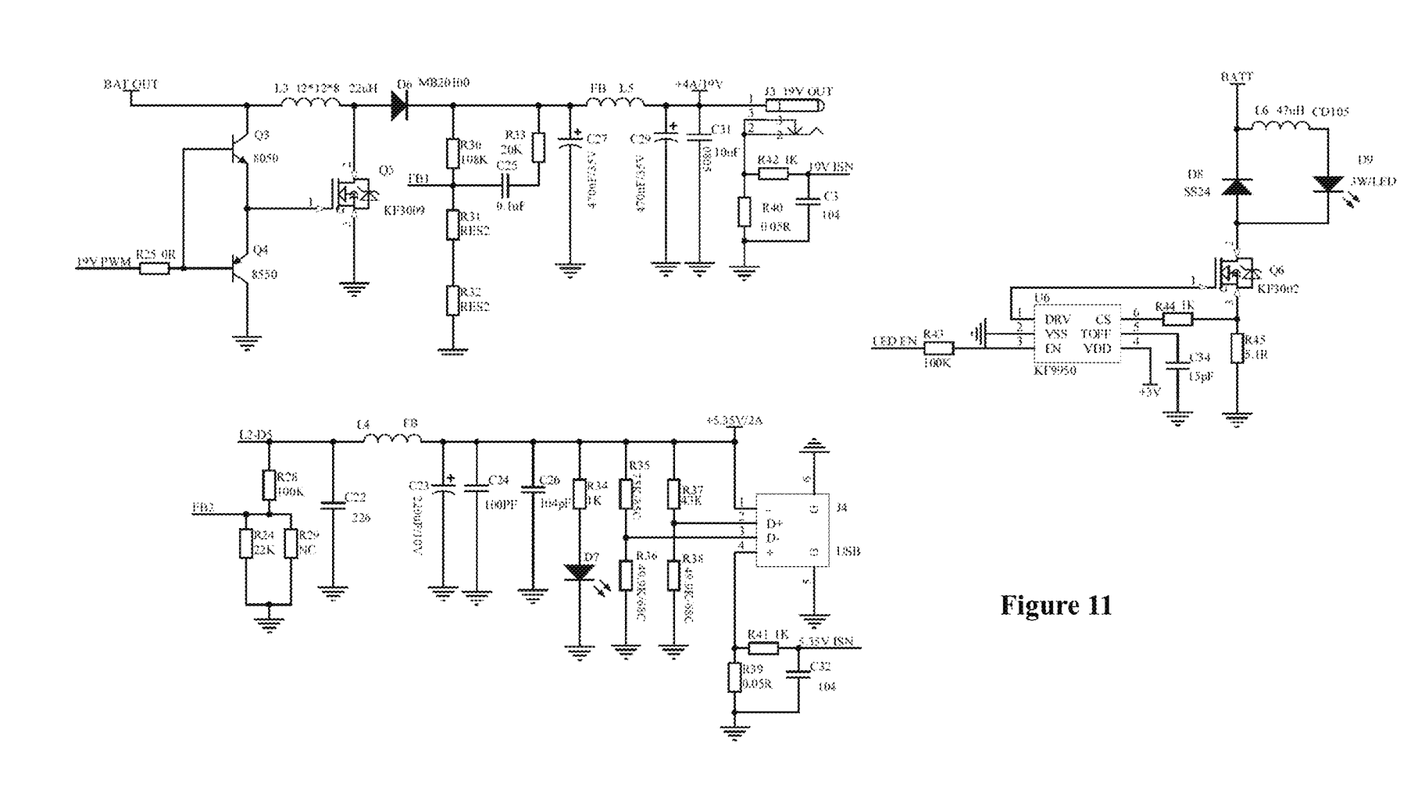

As shown in FIG. 3, the set of batteries is connected to multiple DC-DC voltage adjusting circuits including a DC-DC 19 V-output boost circuit 4, a 12 V output circuit 5, and a DC-DC 5 V-output buck circuit 6. Each of the multiple DC-DC voltage adjusting circuits is connected to a MCU circuit 7. By controlling the MCU circuit 7, the user can flexibly choose a particular output voltage for the charger (19 V, 12 V, or 5 V) to supply current source for a particular instrument (a cellphone, a computer, a digital camera, and etc.). Furthermore, by observing the intelligent LED battery indicator 8 which is connected to the MCU circuit 7, the power storage of the set of batteries 1 is known.

Because the charger of the present application adopts lithium iron phosphate batteries or lithium cobalt oxide batteries to constitute an energy storage element, the charger possesses the characteristics of light weight, small volume, durability, high instantaneous current, and high repeatability in charging. In addition, since the input of the set of batteries 1 is connected to the output of a charging circuit 2, the charger is capable of self-charging. In addition, since the set of batteries 1 is connected to a 12 V output circuit outputting a current in the range of 100 A to 400 A 9, the charger can output a 100-400 A current source under a 12 V voltage and can be a start-up current source for an automobile in emergency. The 12 V output circuit outputting a current in the range of 100 A to 400 A 9 is directly connected to the two ends of the set of batteries without interference with the charging-discharging protection circuit. For the purpose of avoiding overheating the batteries by the short circuit between the positive clamp and the negative clamp or by the reverse connection in the emergent start-up process of an automobile, a 150 A-250 A fuse is connected between the set of batteries 1 and the 12 V output circuit outputting a current in the range of 100 A to 400 A 9. The output terminals of the 12 V output circuit outputting a current in the range of 100 A to 400 A 9 are connected to a reverse connection-proof plug, the external positive and negative connecting wires are silica-gel wires in different lengths.

For the purpose of ensuring safety in the process of charging or discharging the set of batteries 1, a charge-discharge protection circuit 11 is connected to the set of batteries 1 for overcurrent or overload protection.

For the purpose of supplying outdoor light, a LED drive circuit 3 and a LED light 10 are connected successively to the set of batteries 1. Therefore, the charger of the application is able to be used as an outdoor light.

The circuits of the charger are shown in FIGS. 2-5.

Another circuit diagram for implementing the portable backup charger are shown in FIGS. 8-11, each of which shows a portion of the circuit diagram.

While particular embodiments of the application have been shown and described, it will be obvious to those skilled in the art that changes and modifications may be made without departing from the application in its broader aspects, and therefore, the aim in the appended claims is to cover all such changes and modifications as fall within the true spirit and scope of the application.

What is claimed is:

1. A portable backup charger, comprising:
   a battery pack having at least one battery cell;
   at least one output port coupled to the battery pack, wherein the battery pack is configured to output a first current through one or more output ports of the at least one output port in a first operating mode;
   a pair of output terminals coupled to the battery pack and having a current path to the battery pack different from that of the at least one output port to the battery pack, wherein the battery pack is configured to output a second current capable of starting a vehicle engine through the pair of output terminals in a second operating mode, wherein the second current is higher than the first current;
   a first protection circuit coupled to the battery pack and configured to protect the battery pack when the battery pack is working in the first operating mode; and
   a second protection circuit coupled to the battery pack and configured to prevent overcurrent condition of the second current when the battery pack is working in the second operating mode.

2. The portable backup charger of claim 1, wherein when the first protection circuit is configured to prevent overcurrent condition of the first current, and overcharge and overdischarge condition of the battery pack.

3. The portable backup charger of claim 1, wherein the battery pack is further configured to work in a third operating mode for outputting the first current and the second current simultaneously, and in the third operating mode both the first protection circuit and the second protection circuit are active.

4. The portable backup charger of claim 1, wherein the second protection circuit comprises a fuse.

5. The portable backup charger of claim 4, wherein the fuse has a rating current of 150 to 250 A.

6. The portable backup charger of claim 1, further comprising a pair of connecting wires for detachably coupling the pair of output terminals with the battery pack, each connecting wire having a clamp for clamping an electrode of an external vehicle battery.

7. The portable backup charger of claim 6, wherein the second protection circuit is built into at least one of the pair of connecting wires.

8. The portable backup charger of claim 6, wherein the pair of connecting wires comprises a reverse connection-proof plug.

9. The portable backup charger of claim 1, further comprising a switching module operable to switch on or off the second current from the battery pack.

10. The portable backup charger of claim 9, wherein the switching module is further configured to prohibit the outputting of the second current after a predetermined time period has passed.

11. The portable backup charger of claim 1, further comprising at least one voltage adjusting circuit, each voltage adjusting circuit being coupled between the battery pack and one of the at least one output port and configured to elevate or reduce an output voltage of the battery pack to a predetermined voltage at the respective output port.

12. The portable back up charger of claim 1, wherein the first current is of 0.5 to 10 A.

13. The portable backup charger of claim 1, wherein the second current is of 100 to 400 A.

14. The portable backup charger of claim 1, further comprising a controller configured to control the operating mode of the battery pack.

15. The portable backup charger of claim 1, wherein the discharge rate of the battery pack is in a range of 20 c to 70 c.

16. The portable backup charger of claim 1, wherein the at least one output port comprises a universal serial bus (USB) port.

17. The portable backup charger of claim 1, wherein the at least one output port comprises an output port of a rating voltage of 12V.

18. The portable backup charger of claim 1, wherein the at least one output port comprises an output port of a rating voltage of 19V.

19. The portable backup charger of claim 1, wherein the at least one battery cell is lithium based battery cell.

20. The portable backup charger of claim 1, wherein the pair of output terminals is detachably coupled to the battery pack.

21. A portable backup charger, comprising:
a battery pack having at least one battery cell;
a first current path through which a first current is output by the battery pack when it is working in a first operating mode;
a second current path through which a second current capable of starting a vehicle engine is output by the battery pack when it is working in a second operating mode, wherein the second current is higher than the first current;
a first protection circuit coupled to the battery pack and configured to protect the battery pack when it is working in the first operating mode; and
a second protection circuit coupled in the second current path and configured to prevent overcurrent condition of the second current when it is working in the second operating mode.

22. The portable backup charger of claim 21, wherein the first protection circuit is configured to prevent overcurrent condition of the first current, and overcharge and overdischarge condition of the battery pack.

23. The portable backup charger of claim 21, wherein the battery pack is further configured to work in a third operating mode for outputting the first current and the second current simultaneously, and in the third operating mode both the first protection circuit and the second protection circuit are active.

24. The portable backup charger of claim 21, wherein the second protection circuit comprises a fuse having a rating current of 150 to 250 A.

25. The portable backup charger of claim 21, further comprising:
a pair of connecting wires for detachably coupling the battery pack with the vehicle engine to allow the second current flow through the second current path;
wherein the second protection circuit is built into at least one of the pair of connecting wires.

26. The portable backup charger of claim 21, further comprising a switching module operable to switch on or off the second current path.

27. The portable backup charger of claim 21, wherein the second current is of 100 to 400 A.

28. The portable backup charger of claim 21, further comprising a controller configured to control the operating mode of the battery pack.

29. The portable backup charger of claim 21, wherein the discharge rate of the battery pack is in a range of 20 c to 70 c.

30. The portable backup charger of claim 21, wherein the at least one output port comprises a universal serial bus (USB) port.

31. The portable backup charger of claim 21, wherein the at least one output port comprises an output port of a rating voltage of 12V.

32. The portable backup charger of claim 21, wherein the at least one output port comprises an output port of a rating voltage of 19V.

33. The portable backup charger of claim 21, wherein the at least one battery cell is lithium based battery cell.

* * * * *

(12) INTER PARTES REVIEW CERTIFICATE (4155th)
United States Patent (10) Number: US 9,643,506 K1
Lei (45) Certificate Issued: Oct. 20, 2025

(54) PORTABLE BACKUP CHARGER

(71) Applicant: Xingliang Lei

(72) Inventor: Xingliang Lei

(73) Assignee: SHENZHEN CARKU TECHNOLOGY CO., LTD.

Trial Number:

IPR2024-00222 filed Nov. 21, 2023

Inter Partes Review Certificate for:

Patent No.: 9,643,506
Issued: May 9, 2017
Appl. No.: 15/141,841
Filed: Apr. 29, 2016

The results of IPR2024-00222 are reflected in this inter partes review certificate under 35 U.S.C. 318(b).

INTER PARTES REVIEW CERTIFICATE
U.S. Patent 9,643,506 K1
Trial No. IPR2024-00222
Certificate Issued Oct. 20, 2025

AS A RESULT OF THE INTER PARTES REVIEW PROCEEDING, IT HAS BEEN DETERMINED THAT:

Claims 1-3, 6-23 and 25-33 are cancelled.

\* \* \* \* \*